United States Patent [19]
Keba et al.

[11] Patent Number: 5,524,279
[45] Date of Patent: Jun. 4, 1996

[54] METHOD AND APPARATUS FOR IMPROVING PERCEIVED QUALITY OF A STORED VOICE MESSAGE IN A COMMUNICATION RECEIVER

[75] Inventors: James M. Keba, Sunrise; Clinton C. Powell, II, Lake Worth, both of Fla.

[73] Assignee: Motorola, Inc., Schaumburg, Ill.

[21] Appl. No.: 345,016

[22] Filed: Nov. 23, 1994

Related U.S. Application Data

[63] Continuation of Ser. No. 65,412, May 24, 1993, abandoned.

[51] Int. Cl.$^6$ .................................................. H04B 15/00
[52] U.S. Cl. .................. 455/52.1; 455/63; 455/226.2; 455/296; 381/94; 379/80; 379/88; 340/825.44
[58] Field of Search .................... 455/52.3, 52.1, 455/63, 65, 67.1, 67.3, 295, 303, 226.2, 89, 38.4, 221, 222, 223, 186.1, 212, 226.3, 296; 381/94, 110; 367/198; 340/825.44; 379/68, 80, 88, 67; 375/351

[56] References Cited

U.S. PATENT DOCUMENTS

| | | | |
|---|---|---|---|
| 4,479,153 | 10/1984 | Kahn | 455/63 |
| 4,873,520 | 10/1989 | Fisch et al. | |
| 4,905,003 | 2/1990 | Heiferich | |
| 4,926,484 | 5/1990 | Nakano | 381/110 |
| 4,949,085 | 8/1990 | Fisch et al. | |
| 4,965,569 | 10/1990 | Bennett et al. | |
| 5,408,693 | 4/1995 | Alton et al. | 455/212 |

OTHER PUBLICATIONS

Motorola MX300 Series "Handle-Talkie" FM Two-Way Portable Radios Theory/Maintenance Manual, 68P81013C70-A.

Motorola "KeyNote" Series Two-Tone Sequential Radio Pagers Tone and Voice with Voice Memory 406-420/450-512 MHz Instruction Manual 68P81011B90-0.

*Primary Examiner*—Reinhard J. Eisenzopf
*Assistant Examiner*—Doris To
*Attorney, Agent, or Firm*—R. Louis Breeden

[57] ABSTRACT

A method and apparatus improves the perceived quality of a voice message received in a radio signal by a radio communication receiver (108) having voice storage capability and operating in a fading signal environment. A monitor (203) repeatedly monitors (304) a received radio signal quality indication during intervals of reception of contiguous portions of the voice message, and a selective storage element (228) selectively stores (308) for later playback (404) only those portions of the voice message received during the intervals of reception having a radio signal quality indication higher than a predetermined threshold.

9 Claims, 4 Drawing Sheets

METHOD AND APPARATUS FOR IMPROVING PERCEIVED QUALITY OF A STORED VOICE MESSAGE IN A COMMUNICATION RECEIVER

This is a continuation, of application Ser. No. 08/065,412 filed on May 24, 1993, now abandoned.

FIELD OF THE INVENTION

This invention relates in general to radio communication receivers, and more specifically to a method and apparatus for improving perceived quality of a stored voice message in a radio communication receiver operating in a fading signal environment.

BACKGROUND OF THE INVENTION

Selective call receivers (radio pagers) having voice message delivery capability are well known in the art. A disadvantage inherent in real-time voice radio communications, such as radio voice paging, is that in areas somewhat removed from a transmission source, i.e., "fringe" areas, as well as in close-in areas where there is shadowing from tall buildings, reception is compromised by multipath signal fading. In the case of a receiver traveling in a vehicle (a common environment for a radio pager), multipath fading typically is characterized by brief, e.g., less than one millisecond, deep signal fades. Such deep fades are typically flanked by longer, e.g., one-hundred millisecond, periods of relatively good signal strength. When a voice message is listened to in this fading signal environment, brief noise bursts are perceived in the received audio, which are annoying and can reduce perceived quality as well as intelligibility of the voice message.

Recent advances in digital technology have made it economically feasible to add voice storage capability to radio paging receivers. Voice storage has allowed a voice message to be digitized and stored in a digital memory of the selective call receiver for immediate recall and playback by a user desiring to hear the voice message again. Unfortunately, conventional radio paging receivers—even those with the new voice storage feature—have continued to suffer from the audio noise bursts caused by a fading radio signal environment.

Thus, what is needed is a method and apparatus for improving the perceived quality of voice messages received in a fading radio signal environment. Such an improvement in perceived quality would be particularly desirable in pagers with voice storage capability, which necessarily are more costly to manufacture and are therefore likely to invoke higher performance expectations from users.

SUMMARY OF THE INVENTION

One aspect of the present invention is a method of improving the perceived quality of a voice message received in a radio signal by a radio communication receiver having voice storage capability and operating in a fading signal environment. The method comprises the steps of repeatedly monitoring a received radio signal quality indication during intervals of reception of contiguous portions of the voice message, and selectively storing for later playback only those portions of the voice message received during the intervals of reception having a radio signal quality indication higher than a predetermined threshold.

Another aspect of the present invention is an apparatus for improving the perceived quality of a voice message received in a radio signal by a radio communication receiver having voice storage capability and operating in a fading signal environment. The apparatus comprises a monitor coupled to the radio communication receiver for repeatedly monitoring a received radio signal quality indication during intervals of reception of contiguous portions of the voice message. The apparatus further comprises a selective storage element coupled to the monitor for selectively storing for later playback only those portions of the voice message received during the intervals of reception having a radio signal quality indication higher than a predetermined threshold.

Another aspect of the present invention is a selective call receiver, comprising a receiver element for receiving a radio signal and demodulating a voice message carried therein, and a decoder coupled to the receiver element for decoding a selective call address also carried in the radio signal. The selective call receiver further comprises a processor coupled to the receiver element and responsive to the decoder for processing the received voice message, and a memory element coupled to the processor for storing processed voice messages. The selective call receiver further comprises an output element coupled to the memory element for audible playback of the voice message, and apparatus coupled to the processor for improving the perceived quality of the voice message when received in a fading signal environment. The apparatus comprises a monitor coupled to the receiver element for repeatedly monitoring a received radio signal quality indication during intervals of reception of contiguous portions of the voice message. The apparatus further comprises a selective storage element coupled to the monitor and coupled to the memory element for selectively storing for later playback only those portions of the voice message received during the intervals of reception having a radio signal quality indication higher than a predetermined threshold.

DESCRIPTION OF THE PREFERRED EMBODIMENT

Figure 1:
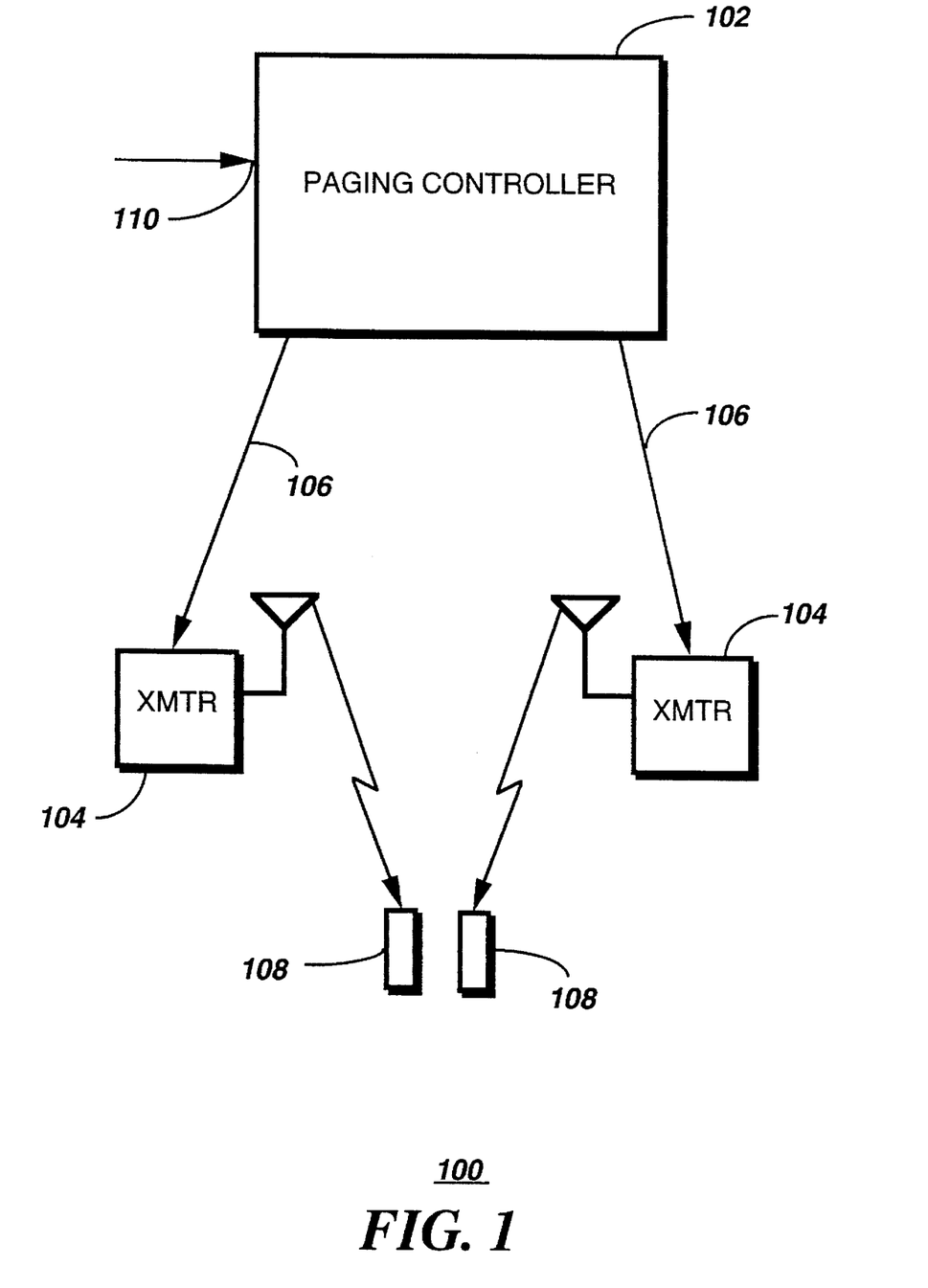
FIG. 1 is an electrical block diagram of a paging system in accordance with the preferred embodiment of the present invention.

Referring to FIG. 1, an electrical block diagram of a paging system 100 in accordance with the preferred embodiment of the present invention comprises a paging controller 102 for formatting selective call messages and controlling the transmission thereof. The paging controller 102 preferably has at least one telephone port 110 for interfacing with the Public Switched Telephone Network for receiving paging calls in a manner well known in the art. Alternatively, there can be a local interface as well, for direct local input of paging calls and messages.

The paging controller 102 is coupled, preferably by telephone lines 106, to paging transmitters 104 for sending paging and control information to the paging transmitters 104. It will be appreciated that other coupling means, such as radio links or dedicated lines, can be used as well to couple the paging controller 102 with the paging transmitters 104. The paging transmitters 104 are coupled by radio links with selective call receivers 108 for sending information including analog voice messages to the selective call receivers 108. Preferably, the paging controller 102 is similar to a model E09PED0552 PageBridge® paging terminal manufactured by Motorola, Inc. of Schaumburg, Ill. The paging transmitter 104 is preferably similar to a model C73 PURC 5000® transmitter manufactured by Motorola, Inc. of Schaumburg, Ill. It will be appreciated that other similar equipment can be used as well for the paging controller 102 and the paging transmitter 104.

During a typical operation of the paging system 100 a caller places a telephone call to the telephone input 110 and identifies a selective call receiver 108 to be signaled. If the caller has identified a selective call receiver 108 having voice message capability, the paging controller 102 will prompt the caller to input a voice message at the proper time. The paging controller 102 then sends a selective call address corresponding to the identified selective call receiver 108 along with the voice message to the paging transmitters 104 in a manner well known in the art. The paging transmitters 104 then transmit the selective call address and the voice message to the selective call receivers 108 using any of a number of well-known paging protocols, such as Golay Sequential Code. In response to one of the selective call receivers 108 receiving the selective call address and finding that the selective call address matches an address pre-programmed therein, the corresponding selective call receiver 108 alerts the user and audibly reproduces the received voice message. Alternatively, in the preferred embodiment of the present invention, when the selective call receiver 108 has voice storage capability, the voice message first is stored by the selective call receiver 108. The user is then alerted and can playback the stored voice message, as will be described below.

Figure 2:
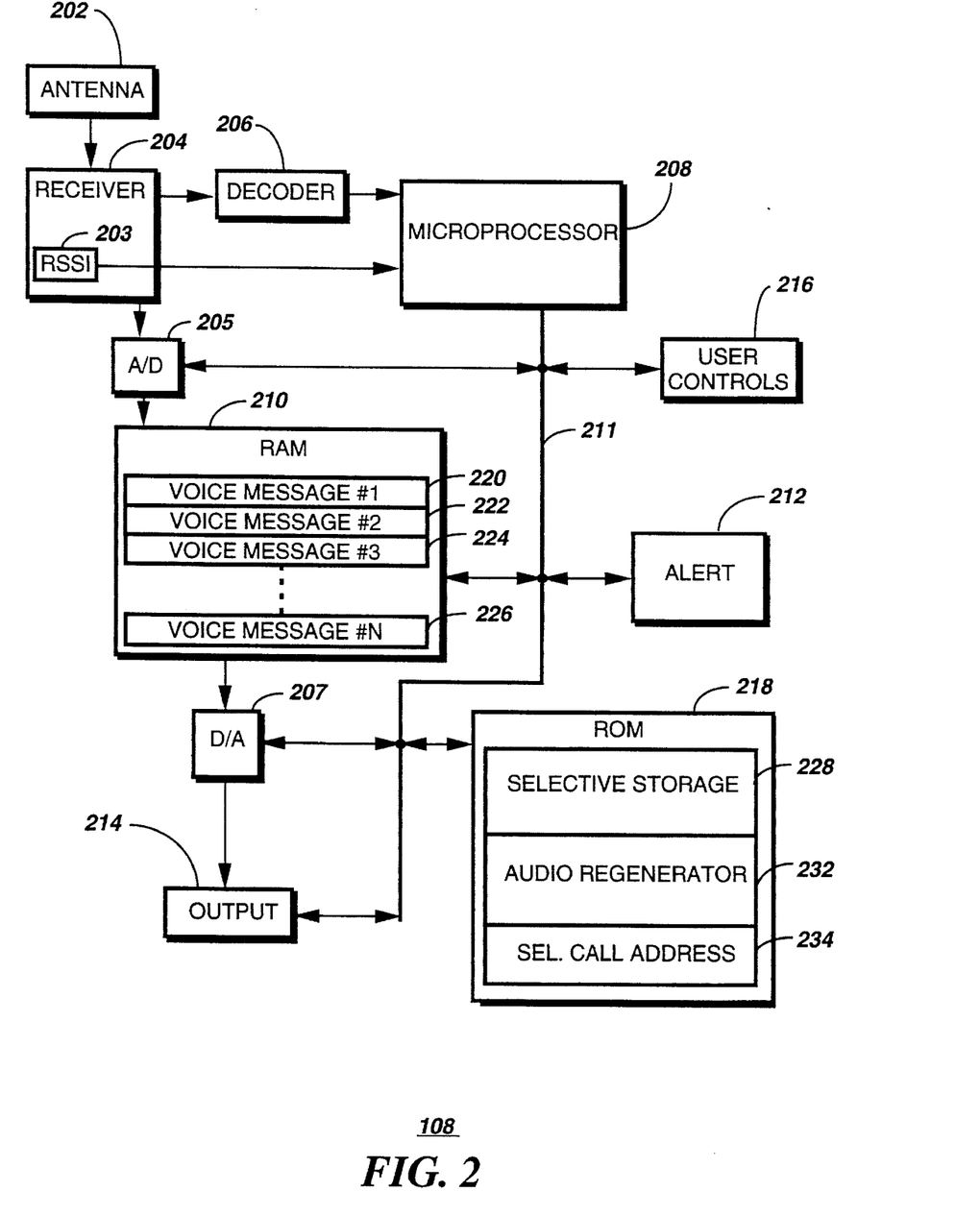
FIG. 2 is an electrical block diagram of a selective call receiver in accordance with the preferred embodiment of the present invention.

Referring to FIG. 2, an electrical block diagram of the selective call receiver 108 in accordance with the preferred embodiment of the present invention comprises an antenna 202 for intercepting RF signals transmitted by the paging transmitters 104. The antenna 202 is coupled to a receiver 204 for receiving and demodulating the RF signals intercepted. A decoder 206 is coupled to the receiver 204 for decoding a demodulated address. A microprocessor 208, e.g., the MC68HC05C8 or C11 series microcomputers manufactured by Motorola, Inc. of Schaumburg, Ill., is also coupled to the receiver 204 for reading a received signal strength indicator (RSSI) 203 to determine received signal power. The RSSI 203 preferably is a conventional, fast-response time, e.g., 125 microsecond, AM demodulator that provides an output voltage corresponding to envelope amplitude of an intermediate frequency (IF) stage of the receiver 204.

The microprocessor 208 is coupled to the decoder 206 for receiving a control signal indicating an address has been decoded, and is also coupled by a bus 211 to a random access memory (RAM) 210 for storing recovered information addressed to the selective call receiver 108. The RAM 210 comprises voice message locations 220, 222, 224, and 226 for storing digitized voice messages. The RAM 210 is coupled to an analog-to-digital (A/D) converter 205 that is coupled to the receiver 204 for digitizing portions of voice messages demodulated by the receiver 204. The RAM 210 is further coupled to a digital-to-analog (D/A) converter 207 for generating analog signals from the digitized voice message portions for playback. The A/D and D/A converters 205, 207 perform according to conversion techniques well-known in the art, e.g., Pulse Code Modulation (PCM), Continuous Slope Delta Modulation (CVSD), or Vector Sum Excited Linear Predictive Coded (VSELP) conversion. The output of the D/A converter 207 is coupled to an output element 214 for acoustically reproducing the voice messages. The A/D converter 205 and the D/A converter 207 are further coupled to the microprocessor 208 by the bus 211 for control by the microprocessor 208.

User controls 216 also are coupled to the bus 211 for allowing a user to command the microprocessor 208 to perform selective call receiver operations well known to one of ordinary skill in the art. The user controls 216 typically include control switches such as an on/off control button, a function control, etc. An alert generator 212 also is coupled to the microprocessor 208 by the bus 211 for providing an audible or tactile alert to a user when the decoded address has matched a selective call address 234 pre-programmed into the selective call receiver 108, and an accompanying voice message has been fully processed and selectively stored in the RAM 210.

The selective call address 234 is located in a read-only memory (ROM) 218 coupled to the microprocessor 208 by the bus 211. The ROM 218 further contains a selective storage element 228 for providing instructions to the microprocessor 208 for selectively controlling the digitization and storage of the voice messages by the A/D converter 205 and the RAM 210 in accordance with the preferred embodiment of the present invention. The ROM 218 also includes an audio regenerator element 232 for providing instructions to the microprocessor 208 for controlling the regeneration of the voice messages by the RAM 210, the D/A converter 207, and the output element 214. Advantageously, implementation of the selective call receiver 108 in accordance with the preferred embodiment of the present invention can be achieved at substantially no additional cost compared to the cost of implementing a selective call receiver having conventional voice storage, except for a very small additional cost associated with the RSSI 203.

It will be appreciated that the functions of the ROM 218 can be performed as well by other types of non-volatile memory, e.g., programmable ROM (PROM), electrically erasable PROM (EEPROM), electrically alterable ROM (EAROM), etc. It will be further appreciated that the decoder 206, the microprocessor 208, the A/D converter 205, the D/A converter 207, and the ROM 218 can be functionally combined in whole or in part on one or more contiguous integrated circuits.

Figure 3:
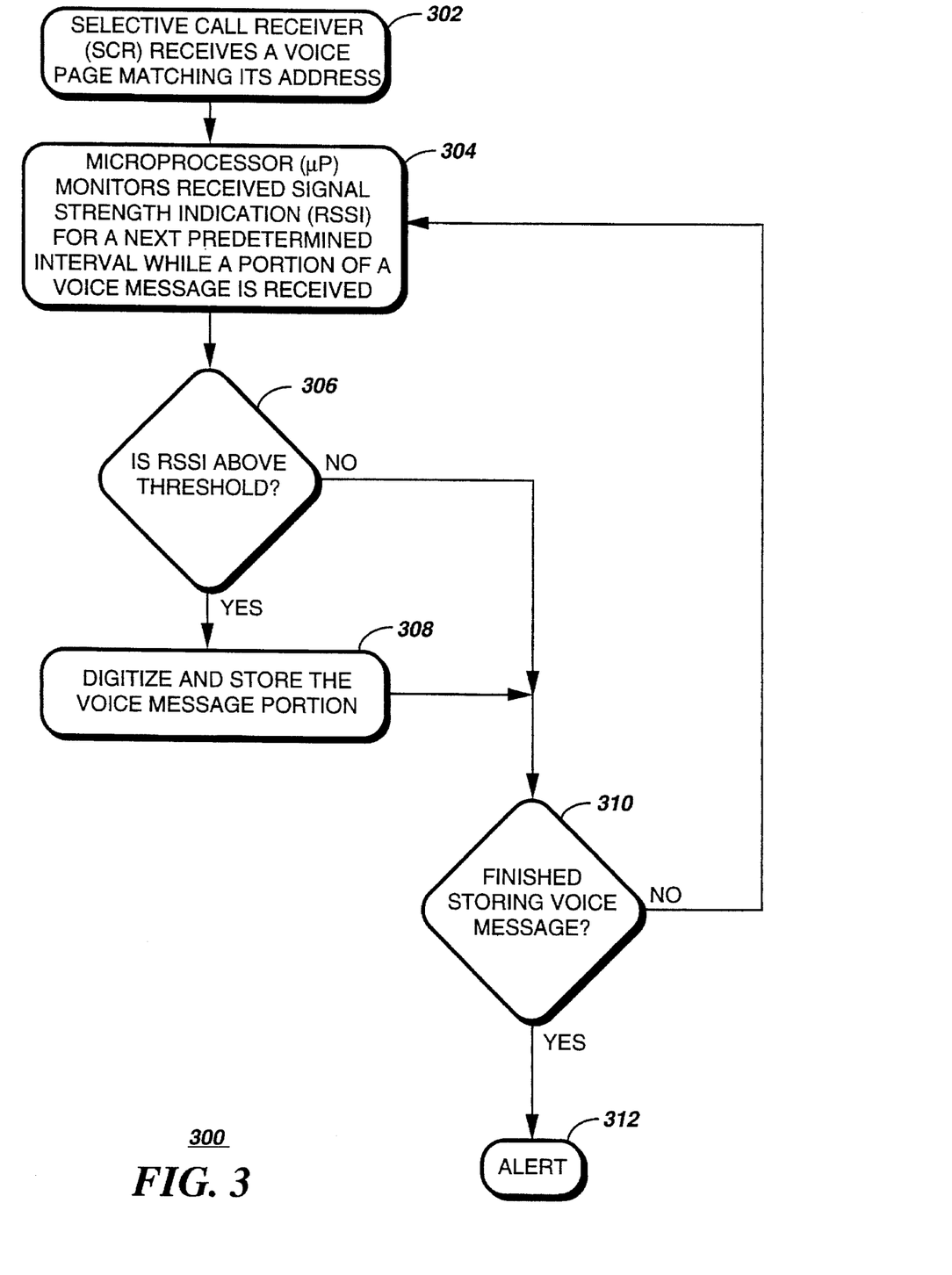
FIG. 3 is a flow chart of voice storage operation of the selective call receiver in accordance with the preferred embodiment of the present invention.

Referring to FIG. 3, a flow chart 300 of voice storage operation of the selective call receiver 108 in accordance with the preferred embodiment of the present invention begins with the microprocessor 208 determining 302 that the decoder 206 has decoded an address matching the selective call address 234. In response, the microprocessor 208 accesses the selective storage element 228, and monitors 304 the RSSI 203 for a next predetermined time interval, typically equal to the sampling time of the A/D conversion method being utilized, while a portion of a voice message is being received and demodulated by the receiver 204. If in step 306 the microprocessor 208 determines that the RSSI 203 is indicating above a predetermined threshold, for example, an RSSI corresponding to at least twelve dB SINAD, the microprocessor 208 then controls 308 the A/D converter 205 and the RAM 210 to digitize and store the corresponding voice message portion in an available voice message location 220, 222, 224, 226.

If, on the other hand, in step 306 the microprocessor 208 determines that the RSSI 203 is not indicating above the predetermined threshold, then step 308 is skipped, effectively deleting the corresponding noisy portion from the digitized stored voice message progressively being stored in the RAM 210. In either case, flow continues to step 310, where the microprocessor 208 tests whether the entire voice message has been processed. If so, the microprocessor 208 controls the alert generator 212 to generate 312 an alert. If not, the flow returns to step 304 to monitor the next time interval.

In the manner described above, the preferred embodiment of the present invention effectively eliminates those portions of the voice message that are received at a signal strength below the predetermined threshold. By selecting the predetermined threshold to correspond to a signal strength below which there would be only marginal intelligibility of the received voice message, perceived quality of the voice message is improved when regenerated from the selectively stored message portions.

Figure 4:
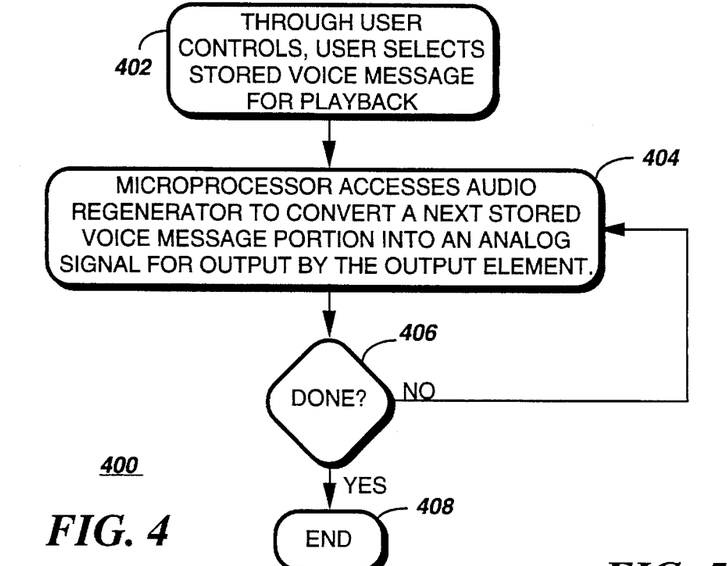
FIG. 4 is a flow chart of the voice playback operation of the selective call receiver in accordance with the preferred embodiment of the present invention.

Referring to FIG. 4, a flow chart 400 of voice playback operation of the selective call receiver 108 in accordance with the preferred embodiment of the present invention begins with the user operating the user controls 216 to select 402 a stored voice message for playback. In response, the microprocessor 208 accesses 404 the audio regenerator element 232 to control the RAM 210, the D/A converter 207, and the output element 214 to audibly regenerate a next portion of the selected stored voice message. Then the microprocessor 208 checks 406 whether the entire stored voice message has been regenerated. If so, the process ends 408. If not, the flow returns to step 404 to audibly regenerate the next portion of the selected stored voice message.

In regenerating the stored voice message, there is preferably no attempt to reconstruct the deleted portions of the original voice message. There also is preferably no attempt to reconstruct the temporal structure of the original voice message, e.g., by inserting intervals of silence equal to the duration of the deleted portions. It will be appreciated by one of ordinary skill in the art that either or both of these reconstructions can be performed, if desired, at additional expense to cover added circuit complexity.

Figure 5:
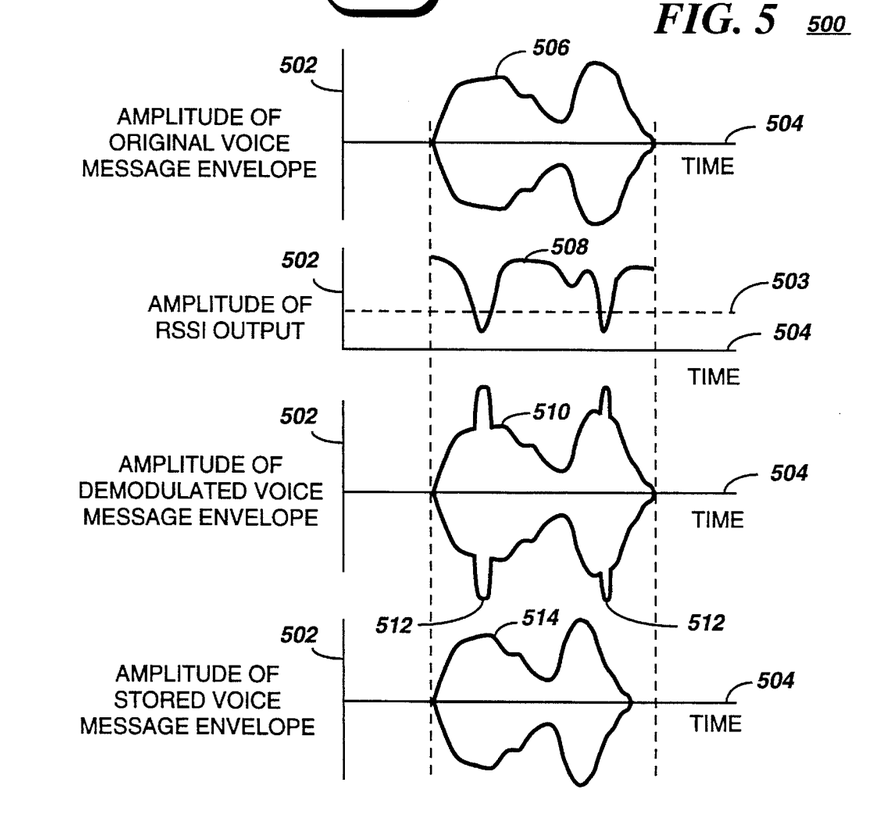
FIG. 5 is a diagram of various signal envelopes within the paging system depicting operation of the selective call receiver in accordance with the preferred embodiment of the present invention.

Referring to FIG. 5, a diagram 500 of various signal envelopes within the paging system 100 depicts operation of the selective call receiver 108 in accordance with the preferred embodiment of the present invention. In the diagram 500, amplitude of each envelope is represented along a vertical axis 502, while time is represented along a horizontal axis 504. The first envelope 506 represents two syllables of a voice message as originally input into the paging system 100. The second envelope 508 is the output of the RSSI 203, which represents received signal strength in a fading signal environment. The dashed line 503 depicts an RSSI level below which the received voice message becomes substantially unintelligible.

The third envelope 510 represents the two syllables as demodulated by the receiver 204. Note that during the portions of the syllables in which the RSSI level is below the dashed line 503, there are undesirable noise bursts 512 in the speech, as shown in the third envelope 510. The fourth envelope 514 depicts the two syllables as regenerated by the selective call receiver 108, after being selectively stored in accordance with the preferred embodiment of the present invention. Note that the undesirable noise bursts 512 have been eliminated, thereby improving the perceived voice quality during playback of the voice message.

Thus, the present invention provides a method and apparatus for improving the perceived quality of voice messages received in a fading radio signal environment. The improvement in perceived quality is achieved for pagers with voice storage capability. For such pagers, the improvement advantageously is achieved with substantially no increase in manufactured cost.

What is claimed is:

1. A method of eliminating undesirable audio noise bursts in a voice message having a temporal structure and received in a radio signal by a radio communication receiver having voice storage capability and operating in a fading signal environment which causes the undesirable audio noise bursts, the method comprising the steps of:

repeatedly monitoring a received radio signal strength indication during intervals of reception of contiguous portions of the voice message;

eliminating the undesirable audio noise bursts by selectively storing for later playback only those portions of the voice message received during the intervals of reception having a radio signal strength indication higher than a predetermined threshold; and regenerating the voice message from the portions selectively stored, without attempting to reconstruct or maintain the temporal structure of the voice message.

2. The method according to claim 1, wherein the storing step comprises converting the portions of the voice message into a digital format.

3. The method according to claim 2, wherein the regenerating step comprises the step of converting the portions of the voice message stored in the digital format into an analog acoustic signal.

4. Apparatus for eliminating undesirable audio noise bursts in a voice message having a temporal structure and received in a radio signal by a radio communication receiver having voice storage capability and operating in a fading signal environment which causes the undesirable audio noise bursts, the apparatus comprising:

monitor means coupled to the radio communication receiver for repeatedly monitoring a received radio signal strength indication during intervals of reception of contiguous portions of the voice message;

selective storage means coupled to the monitor means for eliminating the undesirable audio noise bursts by selectively storing for later playback only those portions of the voice message received during the intervals of reception having a radio signal strength indication higher than a predetermined threshold; and regeneration means coupled to the selective storage means for regenerating the voice message from the portions selectively stored, without attempting to reconstruct or maintain the temporal structure of the voice message.

5. The apparatus according to claim 4 further comprising converter means coupled to the radio communication receiver for converting the portions of the voice message into a digital format for storage.

6. The apparatus according to claim 5, wherein the regeneration means is also for converting the portions of the voice message stored in the digital format into an analog acoustic signal.

7. A selective call receiver, comprising:

a receiver element for receiving a radio signal and for demodulating a voice message having a temporal structure and carried in the radio signal;

a decoder coupled to the receiver element for decoding a selective call address also carried in the radio signal;

a processor coupled to the receiver element and responsive to the decoder for processing the received voice message;

a memory element coupled to the processor for storing processed voice messages;

an output element coupled to the memory element for audible playback of the voice message; and apparatus coupled to the processor for eliminating undesirable audio noise bursts in the voice message when received in a fading signal environment which causes the undesirable audio noise bursts, the apparatus comprising:

- a monitor coupled to the receiver element for repeatedly monitoring a received radio signal strength indication during intervals of reception of contiguous portions of the voice message;
- a selective storage element coupled to the monitor and coupled to the memory element for eliminating the undesirable audio noise bursts by selectively storing for later playback only those portions of the voice message received during the intervals of reception having a radio signal strength indication higher than a predetermined threshold; and
- a regeneration element coupled to the selective storage element and coupled to the output element for regenerating the voice message from the portions selectively stored, without attempting to reconstruct or maintain the temporal structure of the voice message.

8. The selective call receiver according to claim 7, further comprising a converter coupled to the receiver element for converting the portions of the voice message into a digital format for storage.

9. The selective call receiver according to claim 8, wherein the regeneration element is also for regenerating the voice message by converting the portions of the voice message stored in the digital format into an analog acoustic signal.

\* \* \* \* \*

UNITED STATES PATENT AND TRADEMARK OFFICE
CERTIFICATE OF CORRECTION

PATENT NO. : 5,524,279

DATED : June 4, 1996

INVENTOR(S) : James M. Keba, Clinton C. Powell, II

It is certified that error appears in the above-indentified patent and that said Letters Patent is hereby corrected as shown below:

In column 1, line 55, through, column 2, line 37, please replace the original text of the SUMMARY OF THE INVENTION WITH THE following new text:

--An aspect of the present invention is a method of eliminating undesirable audio noise bursts in a voice message having a temporal structure and received in a radio signal by a radio communication receiver having voice storage capability and operating in a fading signal environment which causes the undesirable audio noise bursts. The method comprises the steps of repeatedly monitoring a received radio signal strength indication during intervals of reception of contiguous portions of the voice message, and eliminating the undesirable audio noise bursts by selectively storing for later play-back only those portions of the voice message received during the intervals of reception having a radio signal strength indication higher than a predetermined threshold. The method further comprises the step of regenerating the voice message from the portions selectively stored, without attempting to reconstruct or maintain the temporal structure of the voice message.

Another aspect of the present invention is an apparatus for eliminating undesirable audio noise bursts in a voice message having a temporal structure and received in a radio signal by a radio communication receiver having a voice storage capability and operating in a fading signal environment which causes the undesirable audio noise bursts. The apparatus comprises a monitor coupled to the

UNITED STATES PATENT AND TRADEMARK OFFICE
CERTIFICATE OF CORRECTION

PATENT NO. : 5,524,279
DATED : June 4, 1996
INVENTOR(S) : James M. Keba, Clinton C. Powell, II It is certified that error appears in the above-indentified patent and that said Letters Patent is hereby corrected as shown below:

radio communication receiver for repeatedly monitoring a received radio signal strength indication during intervals of reception of contiguous portions of the voice message, and a selective storage element coupled to the monitor for eliminating the undesirable audio noise bursts by selectively storing for later playback only those portions of the voice message received during the intervals of reception having a radio signal strength indication higher than a predetermined threshold. The apparatus further comprises a regeneration element coupled to the selective storage element for regenerating the voice message from the portions selectively stored, without attempting to reconstruct or maintain the temporal structure of the voice message.

Another aspect of the present invention is a selective call receiver, comprising a receiver element for receiving a radio signal and for demodulating a voice message having a temporal structure and carried in the radio signal and a decoder coupled to the receiver element for decoding a selective call address also carried in the radio signal. The selective call receiver further comprises a processor coupled to the receiver element and responsive to the decoder for processing the received voice message, and a memory element coupled to the processor for storing processed voice messages. The selective call receiver also includes an output element coupled to the memory element for audible playback of the voice message, and an apparatus coupled to the processor for eliminating undesirable audio noise bursts in the voice message when received in a fading signal environment which causes the undesirable audio noise bursts. The apparatus comprises a monitor coupled to the receiver element for repeatedly monitoring a received radio signal strength indication during intervals of reception of contiguous portions of the voice message, and a selective storage element coupled to the monitor and coupled to the memory element

UNITED STATES PATENT AND TRADEMARK OFFICE
CERTIFICATE OF CORRECTION

PATENT NO. : 5,524,279
DATED : June 4, 1996
INVENTOR(S) : James M. Keba, Clinton C. Powell, II It is certified that error appears in the above-indentified patent and that said Letters Patent is hereby corrected as shown below:

```
for eliminating the undesirable audio noise bursts by selectively
storing for later playback only those  portions of the voice
message received during the intervals of reception having a radio
signal strength indication higher than a predetermined threshold.
The apparatus further comprises a regeneration element coupled to
the selective storage element and coupled to the output element
for regenerating the voice message from the portions selectively
stored, without attempting to reconstruct or maintain the
temporal structure of the voice message.--
```

Signed and Sealed this

Second Day of December, 1997

Attest:

BRUCE LEHMAN

Attesting Officer

Commissioner of Patents and Trademarks